United States Patent
Cho et al.

(10) Patent No.: US 8,015,569 B2
(45) Date of Patent: Sep. 6, 2011

(54) SYSTEM TO SUPPORT THE HETEROGENEITY IN UBIQUITOUS COMPUTING ENVIRONMENT

(75) Inventors: We Duke Cho, Gyeonggi-do (KR); Jeong Tae Lee, Gyeonggi-do (KR); Gyeong Ran Kang, Gyeonggi-do (KR); Dong Sun Choi, Seoul (KR)

(73) Assignee: Ajou University Industry Cooperation Foundation, Gyeonggi-do (KR)

( * ) Notice: Subject to any disclaimer, the term of this patent is extended or adjusted under 35 U.S.C. 154(b) by 1008 days.

(21) Appl. No.: 11/817,253

(22) PCT Filed: Jan. 26, 2006

(86) PCT No.: PCT/KR2006/000310
§ 371 (c)(1),
(2), (4) Date: Aug. 28, 2007

(87) PCT Pub. No.: WO2006/107137
PCT Pub. Date: Oct. 12, 2006

(65) Prior Publication Data
US 2008/0134204 A1 Jun. 5, 2008

(30) Foreign Application Priority Data
Mar. 7, 2005 (KR) .................. 10-2005-0018715

(51) Int. Cl.
*G06F 15/163* (2006.01)
(52) U.S. Cl. ...................... 719/314; 719/313
(58) Field of Classification Search ............ 719/314
See application file for complete search history.

(56) References Cited

U.S. PATENT DOCUMENTS
5,812,768 A 9/1998 Page et al.
2003/0037102 A1* 2/2003 Eckert et al. ............... 709/203
(Continued)

FOREIGN PATENT DOCUMENTS
KR 1020030018467 3/2003
(Continued)

OTHER PUBLICATIONS

Garlan, D.; Siewioek, D.; Smailagic, A.; Steenkiste, P., "Project Aura: Toward Distraction-Free Pervasive Computing," IEEE Pervasive Computing, vol. 1, No. 2, Apr.-Jun. 2002, pp. 22-31 [retrieved from http://impact.asu.edu/~cse591uc/papers/01012334.pdf on Apr. 19, 2011].*

(Continued)

*Primary Examiner* — H. S. Sough
*Assistant Examiner* — Brian Wathen
(74) *Attorney, Agent, or Firm* — Harness, Dickey & Pierce, P.L.C.; Anthony G. Fussner; Kisuk Lee

(57) ABSTRACT

A system for supporting the diversity of a ubiquitous computing environment according to the present invention has a message bus including a message broker managing an intermediary role of delivering an actual message between the subsystems and a messaging adaptor managing an interface function between the message broker and the subsystems, wherein the messaging adaptor is installed in the subsystems and includes a first adaptor including a first application port for interfacing with the subsystems, and a second adaptor including a second application port for interfacing with the first adaptor and the broker port operating with the message broker.

5 Claims, 6 Drawing Sheets

U.S. PATENT DOCUMENTS

| | | | |
|---|---|---|---|
| 2003/0065725 A1 | 4/2003 | Delmer et al. | |
| 2004/0162871 A1* | 8/2004 | Pabla et al. | 709/201 |
| 2004/0192277 A1* | 9/2004 | Pakarinen et al. | 455/418 |
| 2005/0198304 A1* | 9/2005 | Oliver et al. | 709/227 |
| 2005/0261923 A1* | 11/2005 | Brown et al. | 705/1 |
| 2006/0209868 A1* | 9/2006 | Callaghan | 370/428 |

FOREIGN PATENT DOCUMENTS

| | | |
|---|---|---|
| KR | 1020030019669 | 3/2003 |
| KR | 1020070010965 | 1/2007 |
| WO | WO 01/56234 | 8/2001 |

OTHER PUBLICATIONS

Roman, M.; Hess, C.; Cerqueira, R.; Ranganathan, A.; Campbell, R.; Nahrstedt, K., "A Middleware Infrastructure to Enable Active Spaces," IEEE Pervasive Computing, vol. 1, No. 4, Oct.-Dec. 2002, pp. 74-83 [retrieved from http://tyranno.jnu.ac.kr/project/2004/Tech_Force/paper/ on Apr. 19, 2011].*

* cited by examiner

CASE 1

CASE 2

CASE 3

SYSTEM TO SUPPORT THE HETEROGENEITY IN UBIQUITOUS COMPUTING ENVIRONMENT

TECHNICAL FIELD

The present invention relates to a ubiquitous computing environment, particularly, to a system for supporting the diversity of the ubiquitous computing environment which reduces the additional development correction requests to a minimum for various and diverse systems required in the integration platform for the ubiquitous environment construction, and which reduces developers' additional burden to a minimum for the interface development between subsystems for an interaction.

BACKGROUND ART

Generally, a ubiquitous computing environment refers to an environment comprising various apparatuses or systems dynamically united. It is important to form a foundation in which various apparatuses or systems efficiently operate and provide services for users.

The ubiquitous computing environment can be defined as "the environment in which various and portable systems are dynamically harmonized and interact with each other." That is, it is possible that the subsystems of the computing environment dynamically come in and go out and their cooperation relationship can change dynamically. Research is needed about the methodology for efficiently providing the interaction in such a dynamically changing environment.

In the middleware for the ubiquitous computing environment, including the previously well-known Aura (Garlan, D., Siewiorek, D., Smailagic, A., Steenkiste, P., "Project Aura: Toward Distraction-Free Pervasive Computing," IEEE Pervasive Computing, Vol. 1, No. 2, April-June 2002, pp. 22-31), and Gaia (Manuel Roman, Christopher K. Hess, Renato Cerqueira, Anand Ranganathan, Roy H. Campbell, and Klara Nahrstedt, "A Middleware Infrastructure to Enable Active Spaces," IEEE Pervasive Computing, Vol. 1, No. 4, October-December 2002, pp. 74-83), etc., CORBA (Fintan Bolton, Pure Corba, SAMS, July 2001) is used as the methodology for the system interaction.

Since CORBA basically includes the functional elements for both object management and group management in the distributed environment, it may be applied to the ubiquitous computing environment in which independent systems operate.

However, since diversity or portability of systems is frequently demanded in a ubiquitous computing environment than in an existing distributed environment, development of suitable methodology is additionally required.

For example, CORBA has taken a role as an intermediary for connecting different objects, and has been used as the methodology for distinguishing object instances. While minimizing additional corrections to the existing systems, it is used as technology operating with new integrated systems. In the meantime, an adaptor is used as an option for constructing an intelligent home network or connecting apparatuses using different middleware.

Conventional adaptors, however, put emphasis on providing necessary functions depending on an independent case fitting to the object to be operated with each other, but are not designed with the systematic structure. That is, when a new kind of apparatus or middleware is connected, there is burden to re-design the adaptors.

DISCLOSURE OF INVENTION TECHNICAL PROBLEM

Therefore, in order to solve the problems described above, the present invention provides a system for supporting the diversity of a ubiquitous computing environment which reduces the additional development correction requests to a minimum for various and diverse systems required in the integration platform for the ubiquitous environment construction, and which reduces developers' additional burden to a minimum for the interface development between subsystems for an interaction.

Technical Solution

A system for supporting the diversity of a ubiquitous computing environment according to a preferred embodiment of the present invention for achieving an objective as described above is characterized so that it includes a message bus containing a message broker which manages an intermediary role of delivering an actual message between subsystems and a messaging adaptor managing an interface function between the message broker and the subsystems, wherein the message adaptor is installed in the subsystems and is comprised of a first adaptor including a first application port interfacing with the subsystems, and a second adaptor including a second application port interfacing with the first adaptor and a broker port for operating with the message broker.

The system is characterized in that the format of the message is XML (Extensible Markup Language).

The system is characterized in that the first adaptor includes a first application source receiving a message transfer request from the subsystems, and a first application sink receiving the message delivered through the message broker and delivering it to the subsystems.

The system is characterized in that the second adaptor includes pipelines, a Q (queue) and a controller. The pipelines are positioned between the second application port and the broker port, and the pipelines produce a message desired by the subsystem among the messages delivered from the message broker. The Q (queue) is positioned between the broker port and the pipelines, and stores the message transferred to the messaging adaptor through the broker message. The controller controls the second application port, the broker port and the pipelines.

The system is characterized in that the second application port includes a second application source receiving the message transfer request from the first application port, and a second application sink delivering the message from the pipelines to the first application port.

The system is characterized in that the broker port includes a sink of the broker port delivering the message from the pipelines to the message broker, and a source of the broker port delivering the message from the message broker to the pipelines.

The system is characterized in that the message transmitted from the subsystems is delivered to the message broker through the first application sink of the first adaptor, the controller of the second adaptor, the second application source, the pipelines and a sink of the message broker.

Advantageous Effects

According to embodiments of the present invention as described above, the system for supporting the diversity of the ubiquitous computing environment is designed to separate its functional elements as much as possible. In that way, the system may efficiently correspond to the situation in which it expands and changes the information elements of a message according to a change of the message protocol, and make it easy to change its configuration according to the performance of the system.

BEST MODE FOR CARRYING OUT THE INVENTION

Figure 1:
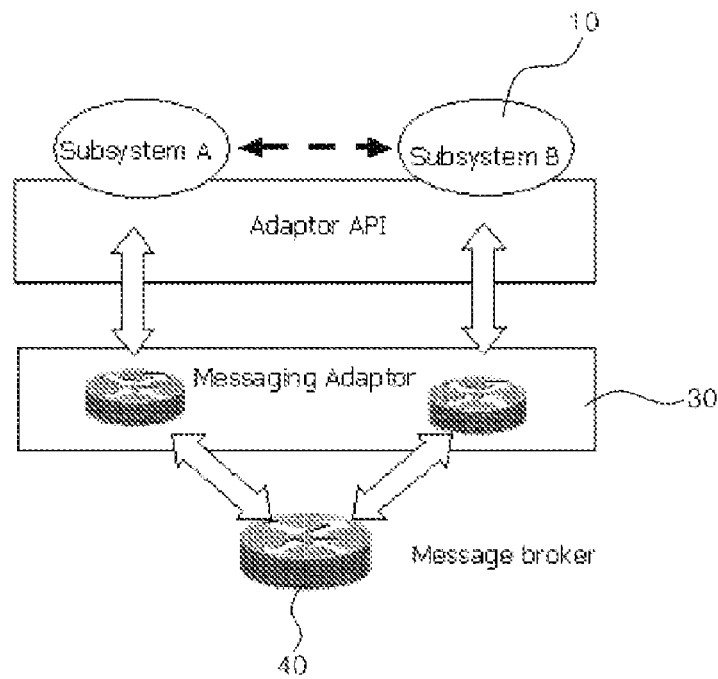
FIG. 1 is a schematic diagram of a system for supporting the diversity of a ubiquitous computing environment according to a preferred embodiment of the present invention.

The present invention will be described in detail with reference to the accompanying drawings and embodiments. In a ubiquitous computing environment, there exists various kinds of systems in which there are personal wireless terminals, sensors, servers and RFID, etc., and the change of the systems is continuously required while they dynamically move or are newly added and transferred to the environment. Therefore, it is important to form a foundation on which it may integrate and operate, while it efficiently corresponds to the movement or the change of the systems to constantly provide a user a service which the ubiquitous computing environment is seeking.

The integration for the ubiquitous computing environment construction means that the infrastructure of naming "the integration platform" is provided and it interacts with other systems since the systems are "connected" to this infrastructure.

"The integration" of the systems in the ubiquitous computing environment is comprised of the points of physical view and logical view.

The integration at the point of physical view means the process is acknowledged as one entity in this integration platform while the corresponding system is installed in a physical space and connected to a network. That is, it means that the corresponding system is connected to the integration platform.

And, the integration at the point of logical view means that it reaches the state in which the other systems within the corresponding ubiquitous computing environment may recognize a new physically integrated system and interact with each other.

In order to support two-stage integration as described above, the function requirements provided at the integration platform may be summarized as five items below.

First, the newly connected system requires the process of "registration" for physical integration with the corresponding ubiquitous computing environment.

Second, it is necessary to have the "name" in order to distinguish a subsystem in the corresponding ubiquitous computing environment. This "name" may have the structure of both reflecting the location of a system and distinguishing the corresponding system irrespective of its location at the same time.

Third, provided is the methodology in which the physically integrated system may obtain the information about existing systems, and the existing systems may obtain the information about the physically integrated system, as well.

Fourth, provided is the methodology in which various systems may efficiently interact with each other without being affected by the implementation situation of the subsystems.

Fifth, provided is the methodology for figuring out, in an administrator's position, what subsystem normally operates in the corresponding ubiquitous computing environment.

Therefore, the present invention suggests a message bus in order to satisfy the fourth requirement above. The reason for using this message bus in the integration platform is because the methodology that interacts by using a message may lower dependability between systems, and may be most efficient in coupling of the systems operating in different environments.

Systems comprising the ubiquitous computing environment communicate by using the message bus. The message bus is comprised of a message broker 40 doing the intermediary role of delivering the actual message between subsystems, and a messaging adaptor 30 managing an interface function between a message broker 40 and a subsystem 10, as shown in FIG. 1.

The message broker 40 manages the role of a message router or a message mediator.

The messaging adaptor 30 provides an interface in which the subsystem 10 operates with the message broker 40.

When the subsystems 10 interact with each other, it may be viewed as a direct communication with the counterpart system, but, in fact, such communication is made through the messaging adaptor 30 and the message broker 40, namely, the message bus.

There are two kinds of advantages when the subsystem 10 uses the message bus without setting up the direct connection with a system which has to interact with oneself.

First, whenever the subsystem 10 clarifies a reception system within a message and delivers it to the message broker 40 by using the message broker 40, the message broker 40 delivers the message to the reception system. That is, the subsystem 10 may send and receive messaging, if it sets up a connection with the message broker 40. In other words, since the various apparatuses and systems exist in the ubiquitous computing environment, it is necessary to have messaging between them. Therefore, the subsystem 10 has to recognize the features of the various systems to be connected if the subsystem 10 manages the direct connection. However, if the message broker 40 is used, it is enough to recognize the other systems as the interaction object, and leave the necessary burden to the message broker 40 for the message switching. In conclusion, the burden may be further reduced in the position of the system developer or the administrator.

Second, the standard format of a message should be defined so that the message broker 40 can efficiently perform intermediation of the message. When the coupling of the existing system and a system newly introduced into the ubiquitous computing environment is considered due to this standard format, it may easily be accessible to the message format. That is, the message format of the existing system is defined based on the standard format, and therefore, the message may be produced, received and transmitted based on the definition. Moreover, since the message in a newly developed system is defined within the same frame, the existing system does not need to modify the procedure for the message processing.

In the meantime, if the range of the ubiquitous computing environment is extended, the layered connection relation between the message broker 40 is organized. And, protocols for exchanging necessary information for intermediation of the message between the message broker 40 are additionally included so that they may make the message switching free between the systems connected to the message broker 40.

Figure 2:
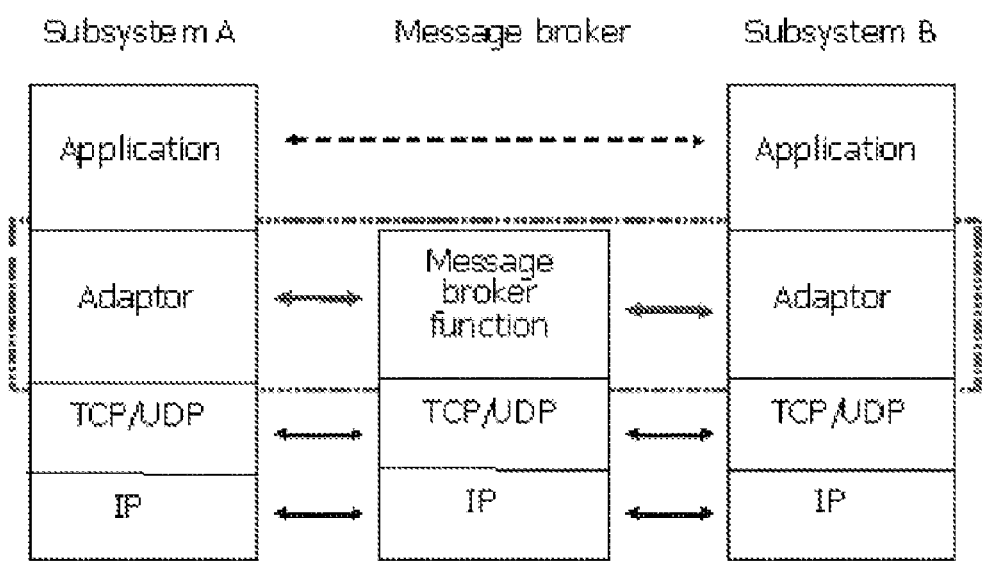
FIG. 2 is a drawing showing the location on a message bus protocol stack.

Moreover, the message bus is positioned between a transport layer and an application layer in the protocol stack, as shown in FIG. 2. In the ubiquitous environment, the consideration for portability is one of the major requirements. The portability support function under the transport layer is utilized to maintain and manage the logical connection between the message broker 40 and the subsystem 10, irrespective of the movement.

The message format that the subsystem 10 exchanges through the message bus follows XML (Tim Bray, Jean Paoli, C. M. Sperberg-McQueen and Eve Maler, Extensible Markup Language 1.0 (Second Edition), W3C Recommendation, eds., October 2000). When the information element is expressed within a message, it may use the format of either fixed byte number (Byte) or MIME (N. Freed, N. Borenstein, Multipurpose Internet Mail Extensions (MIME) Part One: Format of Internet Message Bodies, IETF RFC 2045, November 1996). However, XML has the burden that if a change has occurred in the information element, the part which interprets a message in a system has to be modified a lot. And, MIME has expandability, but it also has the disadvantage which it is not facilitated to express the layered relation between the information element. Therefore, XML is used because it has both expandability and free expression.

Figure 3:
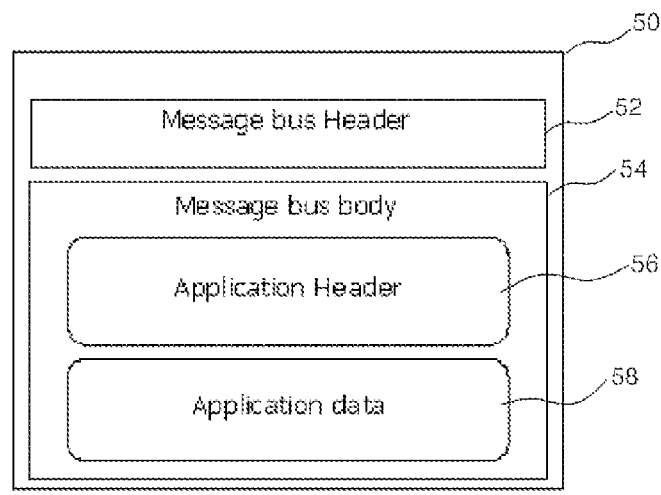
FIG. 3 is a drawing showing the message structure of the present invention.

As shown in FIG. 3, the structure of the message 50 has a layered structure. The message broker 40 is classified into a Message Bus Header 52 in which defines information elements necessary for the intermediation of the message, and Message Bus Body 54.

The Message Bus Body 54 is classified into an Application Header 56 that defines the system sending and receiving the message, and an Application Data 58.

Figure 4:
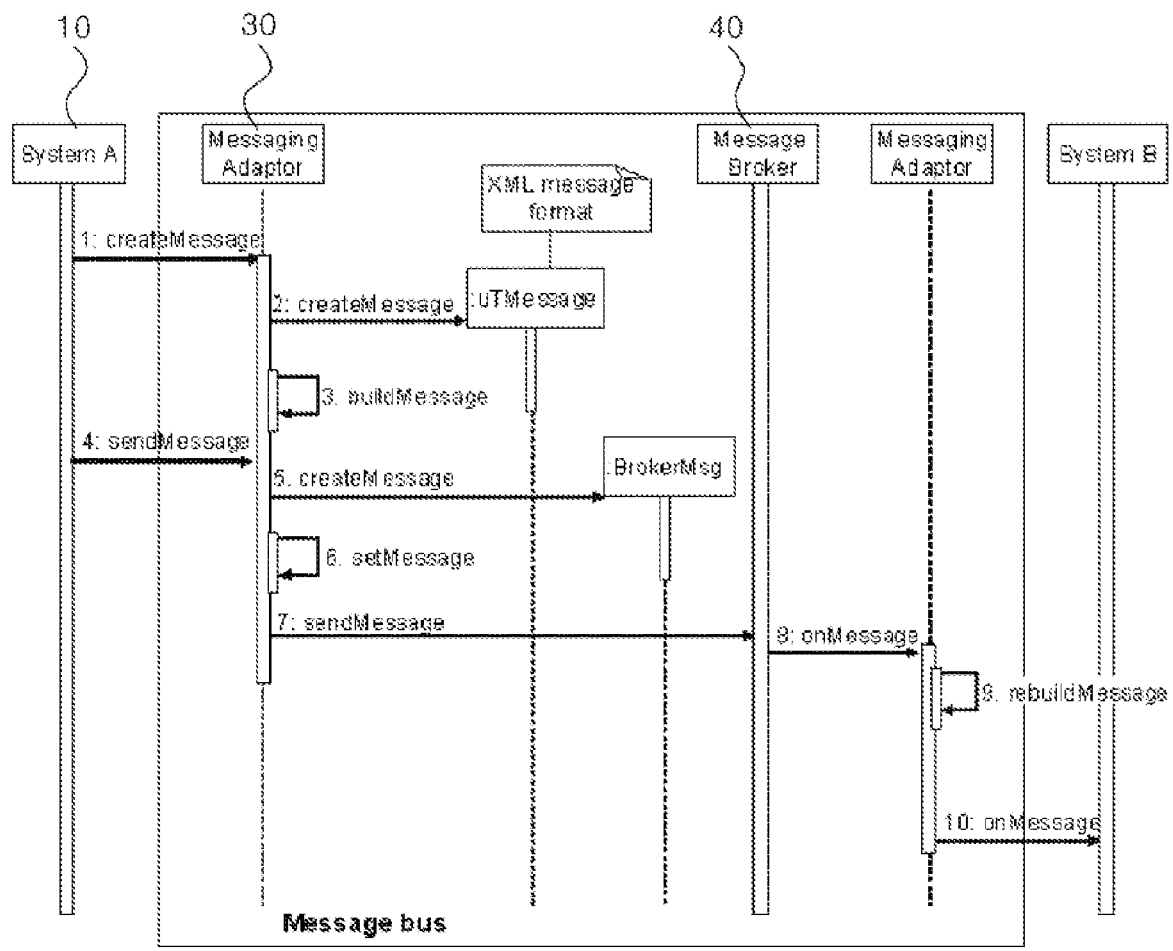
FIG. 4 is a drawing showing the message transfer process between two systems using the message bus of the present invention.

The message transfer process by using the message bus between 2 systems (System A, System B) is illustrated in FIG. 4, as below.

First, the message (=uTMessage) in the XML format made in system A is transformed to the format of the message (=BrokerMsg) to be processed in the message broker 40 by the messaging adaptor 30, and is inversely transformed again before being delivered to the system B.

If a transmitter system requests a create message (create-Message) while delivering the information element for transmitting to the messaging adaptor 30, the messaging adaptor 30 produces a message based on both the previously defined message protocol and XML format. In the case of receiving a message at the reception system, if the information element to extract is registered in an on message (on Message), the messaging adaptor 30 interprets the message based on both the previously defined message protocol and XML format and extracts the corresponding information element and delivers it to the System B.

The message broker 40 performs the function of delivering to a proper reception system without the loss of the message according to the receiver information of a message and the receiving request of the reception systems, etc.

The messaging adaptor 30 performs the role of delivering the message to the message broker 40 which a system transmits. It also performs the role of delivering the message to the system after receiving the message that the message broker 40 arranges to a system. There may be five items to be considered in design, in order to efficiently and reasonably perform such functions, as below.

First, the messaging adaptor 30 has to let a system produce, send and receive a message irrespective of the characteristics of the message broker 40, as the message bus has the subsystem 10 operate irrespective of the characteristics of the other systems. That is, the messaging adaptor 30 may provide flexibility in order to utilize the existing outcomes implemented in the message intermediation function in implementing the message bus as the message broker 40.

Second, there may be a difference between the speed that the system processes the message after receiving it and the message delivery speed from the message broker 40 in the position of the messaging adaptor 30. Particularly, since a subsystem includes a situation recognition function in the ubiquitous computing environment, it has to receive the message from various situation recognition apparatuses. In this case, although many messages are not transmitted from the independent transmitter system, but there are many related transmitter systems, it may deliver more messages than the amount of messages to be processed per unit hour at the reception system. In this case, the message adaptor 40 may provide a provisional message storage function in order to meet the processing speed of the reception system so that the message may not be lost.

Third, various systems or apparatuses are used under the ubiquitous computing environment, for example, from the small-capacity memory like PDA or the apparatus having CPU with the relatively low performance to a server having high-speed CPU or high-capacity memory. Since the messaging adaptor 30 has to support the various systems to operate with the message broker 40, it needs to be applicable to a proper form, according to the computing capacity of the subsystem 10. That is, the messaging adaptor 30 to be installed in a small-capacity apparatus should be modified to require small resources in comparison with the adaptor installed in the high-capacity apparatus.

Fourth, the format of the message for interacting between subsystems is clarified by system developers. However, the support of the messaging adaptor 30 is needed in order for the subsystem developer not to pour the development burden into the detailed process step for both composing and interpreting a message. The information about the message format to be exchanged between systems is provided to the messaging adaptor 30, so that the messaging adaptor 30 may assign the base value about a part of the information element of the message, and the messaging adaptor 30 may provide the necessary function for the organization and interpretation of the message in order to extract and use the necessary information element according to the request of a system, as to the message interpretation. Moreover, since the ubiquitous environment is a variable environment, the message protocol that is once made has a higher possibility to be changed rather than to be continued, according to the environmental change. Therefore, it has to be designed in order to flexibly correspond to such change.

Fifth, provided is the function of not only successively delivering but also differentially processing according to the significance or the urgency of the message, when the messaging adaptor 30 delivers the message to a system in which is delivered from the message broker 40. For example, it may be an occasion where a system is waiting for a response after sending a special request to the other system, or it needs to urgently deliver a message due to the nature of data within the message. In this way, it has to reflect the methodology in the design in which a system may inform the messaging adaptor 30 of the urgent message and deliver an urgent message among messages to a system.

Figure 5:
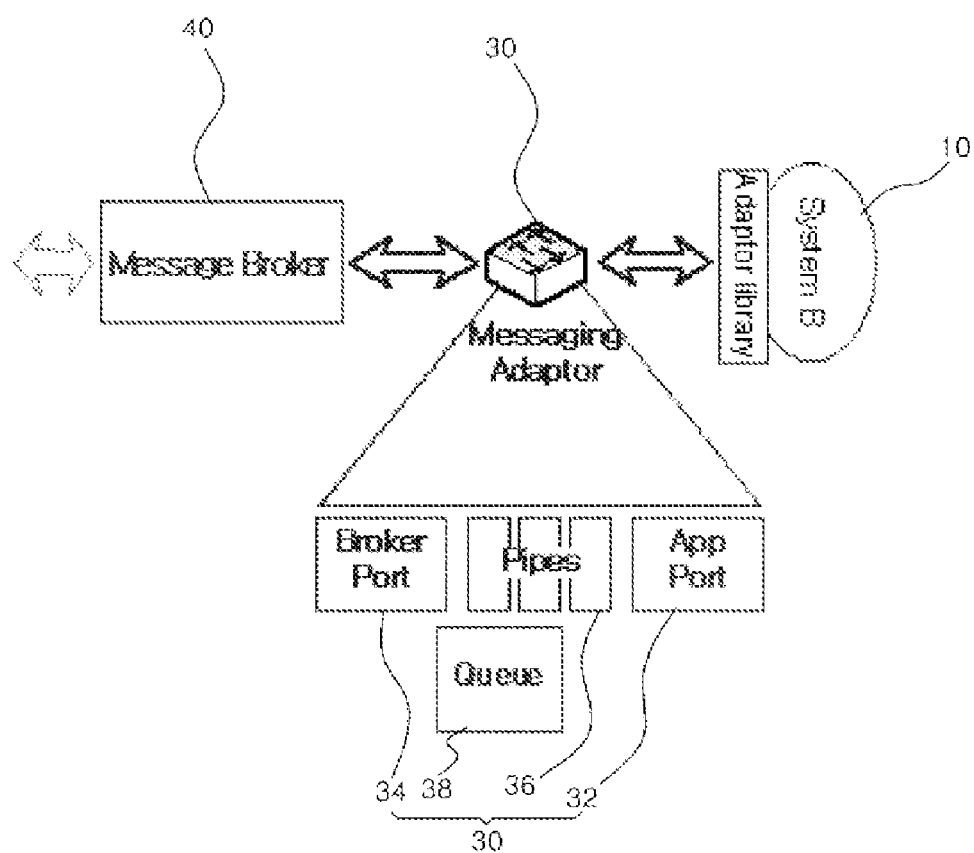
FIG. 5 is a drawing showing the overall abstract structure of the message bus of the present invention.

In order for a subsystem developer to develop the messaging adaptor 30 considering the five design conditions which are easily applied to the messaging bus, as shown in FIG. 5, the format of the programming library may be provided to use the necessary functions of the adaptor. And, the message broker 40 is positioned between the messaging adaptor 30 operating with two systems so that the whole message bus may be seen as the library to the subsystem 10, and the characteristics of the message broker 40 not be seen.

As to the internal configuration of the messaging adaptor 30, it is comprised of an application port (AppPort) 32 for interfacing with the subsystem 10 and a broker port (BrokerPort) 34 for interfacing with the message broker 40.

If it is illustrated a little more, the messaging adaptor 30 includes a first adaptor (not illustrated) and a second adaptor (not illustrated). The first adaptor is installed in the subsystem 10 and includes a first application port (not illustrated) for interfacing with the subsystem 10. The second adaptor includes a second application port (not illustrated) for interfacing with the first adaptor, and a broker port operating with the message broker 40. It is mentioned later about the configuration and operation of the first adaptor and the second adaptor.

As the interfaces with the system 10 and message broker 40 are separated, it is enough to modify the broker port 34 without the need to change the messaging adaptor 30, although the message broker 40 is changed in the development of the message bus. And, it just needs to modify the application port 32, when modification is necessary in consideration of the characteristics of the system using the messaging adaptor 30.

The messaging adaptor 30 further includes pipelines (Pipes) 36 and Q 38. The Pipes are positioned between the application port 32 and the broker port 34, and take charge of the function of both processing and extracting the information element which the system desires, among the messages delivered from the message broker 40. The Q 38 is positioned between the broker port 34 and the Pipes 38.

Since the Pipes 36 are also designed in order to independently operate with two interfaces, it is also enough to modify the Pipes 36 in case the change of the message protocol occurs so that the processing function for the information element in the messages is required to be diversified.

The message delivered through the broker port 34 to the messaging adaptor 30 is stored in the Q 38 for the time being, and the functional element in the Pipes 36 extracts and processes the message in the Q 38 and delivers to the application port 32. In case the flowing speed of the message from the message broker 40, the processing speed of the message of Pipes 36 in the system and the consuming speed of the message of the application port 32 do not coincide, the Q 38 supplements this. Particularly, the flowing message may be temporarily kept in the Q 38 so as not to generate any loss, in case the speed of the message being delivered through the broker port 40 to the message broker 40 is greater than the speed of either the processing speed of the message of the Pipes 36 or the speed of being delivered to a system through the application port 32.

The Q 38 is also used in implementing the differentiated services such as the message priority. In case any message is waiting to be processed urgently in the system, the Pipes 36 is informed by using API and checks out whether there is any important message requested from the system while the Pipes 38 extracts the message. In this way, any important message may be discovered at the moment when it arrives, and it may also be rapidly delivered to the system. And, it may be possible that the message having higher priority is processed and delivered to the system by implementing the Q 38 one by one in accordance with defined priority.

Figure 6:
FIG. 6 is a drawing showing a model applying the message bus of the present invention.
Figure 6:
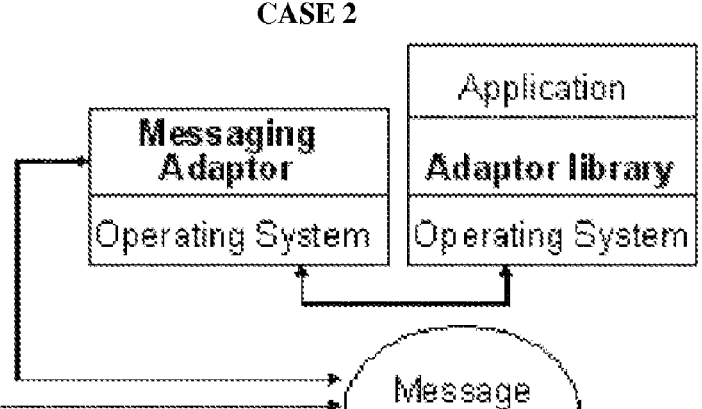
Figure 6:
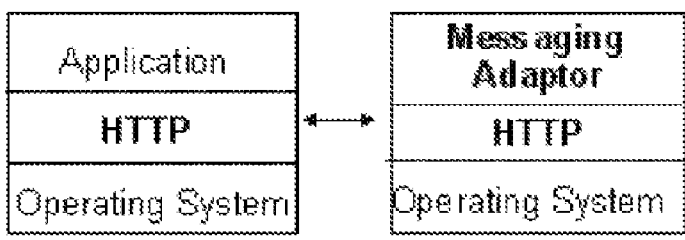

As shown in FIG. 6, this kind of the messaging adaptor 30 may be changed according to the characteristics of the development environment and computing ability of a system.

Case 1

Considered is the case in which a subsystem is implemented in the environment having a high-end CPU and a large amount of memory, etc. The system is implemented by using the form of an adaptor library, and includes a broker port of an adaptor, Pipes and an application port within the corresponding system. It does not have a processing burden in such integration, considering the performance of the CPU or the capacity of the memory.

Case 2.

Considered is a system having low computing ability like the mobile terminal, etc. A broker port, Pipes and an application port are connected to other host through a network, and an adaptor library is only included in the system. The adaptor function is used in the remote. The remote host having sufficient performance is used, because portable terminals cannot possibly manage to translate and configure XML messages.

Case 3.

Basically, for supporting the system using the high level application layered protocol of TCP/IP like HTTP and SOAP etc. other than the socket program based on the simple TCP/IP in an interaction with the other system, the messaging adaptor operates with a system while operating as the HTTP server. The system does not use the adaptor function as employing the messaging adaptor library, but requests the delivery and reception of the message to the messaging adaptor by using the commands of POST and GET of the HTTP. Of course, the message does keep the message standard form defined in the message bus in that moment. The messaging adaptor performs the function of interfacing between the system and the message broker, like the case 1 and the case 2.

Figure 7:
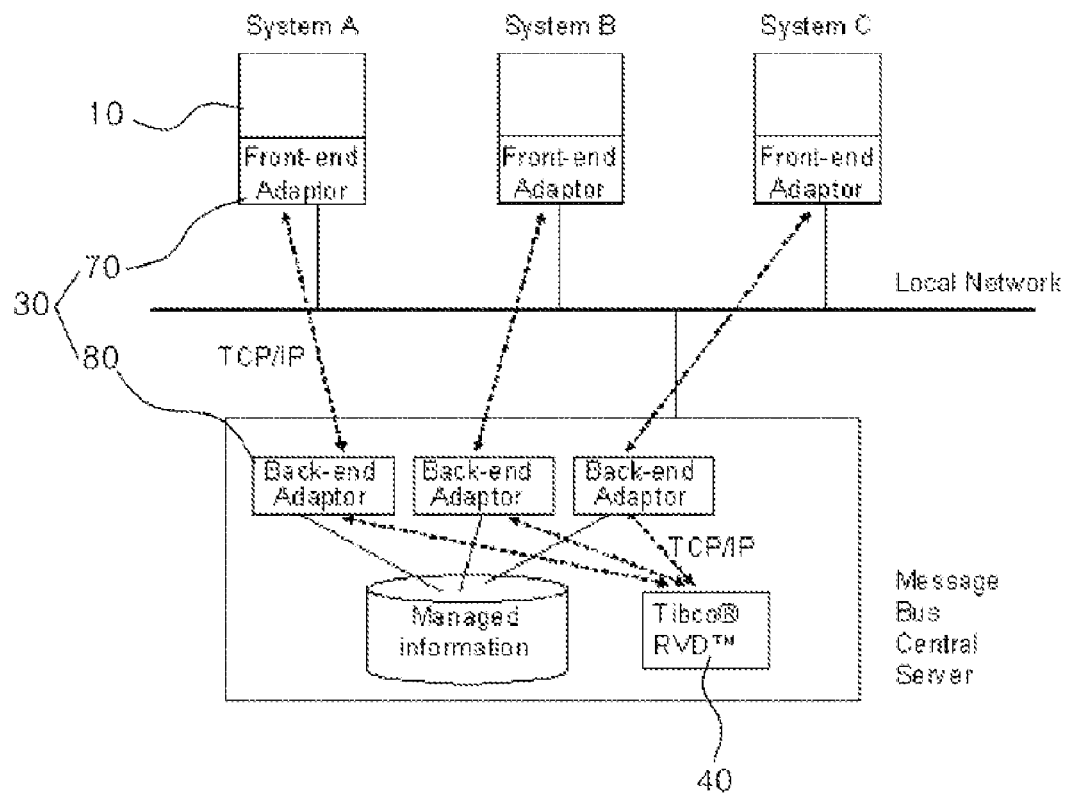
FIG. 7 is a drawing showing the configuration of a message bus and systems of the present invention.

As shown in FIG. 7, the messaging adaptor 30 is classified into a front-end adaptor 70 and a back-end adaptor 80 in order to support Cases 1 through 3. The front-end adaptor 70 is installed at a subsystem. The back-end adaptor 80 operates to the system one by one in the host that the message broker 40 is positioned. The front-end adaptor 70 means the first adaptor as described above and the back-end adaptor 80 means the second adaptor as described above. Hereinafter, the terms of the front-end adaptor 70 and the back-end adaptor 80 are used instead of the terms of the first adaptor and the second adaptor.

It is made by using TCP/IP for both the communication between the front-end adaptor 70 and the back-end adaptor 80, and the communication between the back-end adaptor and the message broker 40.

Figure 8:
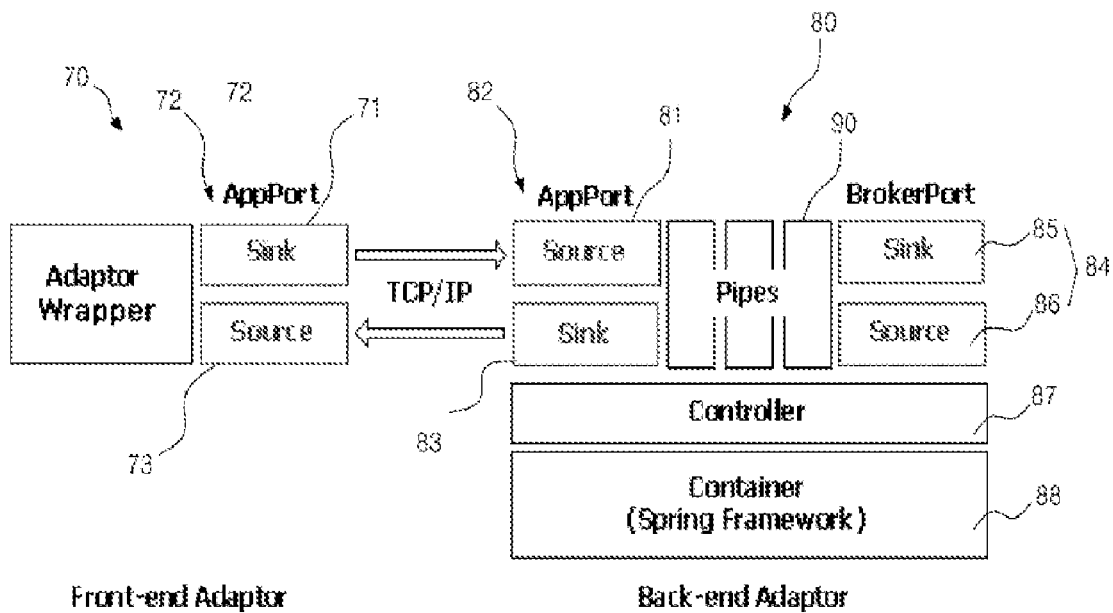
FIG. 8 is a drawing showing a detailed structure of a messaging adaptor of this invention.

Such internal structures of the back-end adaptor 80 and front-end adaptor 70 are shown in FIG. 8.

The front-end adaptor 70 is provided for the system developer in the form of API, and operates as a portion of the system after the system is implemented. Therefore, it should be provided in a version which is appropriate for the programming language and the development environment of the subsystem. For example, the development environment is supported by MICROSOFT WINDOWS®, LINUX®, and Microsoft Windows CETM, and the programming language is implemented by using JAVA® and C.

The front-end adaptor 70 is comprised of both a first application source (Source) 71 and a first application sink (Sink) 73 of the first application port 72. The Source 71 receives the message transfer request from the system, and the Sink 73 plays the role of delivering the message to the system after receiving the message delivered through the message broker 40.

The back-end adaptor 80 is comprised of a second application port 82 for operating with the front-end adaptor 70, a broker port 84 for operating with the message broker, and Pipes 90. The second application port 82 includes both a second application source 81 and a second application sink 83. The broker port 84 includes a broker port source 86 and a broker port sink 85. The Pipes 90 is comprised of the filters performing the additional processing function for a message, and is positioned between the second application port 82 and the broker port 84.

The Pipes 90 may be implemented as the manner that directly calls the filter of the next order among filters. However, Spring Framework (R. Droms, Dynamic Host Configuration Protocol (DHCP), IETF RFC, March 1997) (88) is used in consideration of expanding functions or adding filters.

And, by using the Spring Framework 88, whole elements of the back-end adaptor including the second application port 82 and the broker port 84 are integrated. Since a controller 87 operates by calling the next compositional element within the Spring Framework 88 according to the defined procedure, other compositional elements are not influenced even though the implementation of the compositional element is partially changed. Furthermore, it just needs modification to call the new compositional element in the order defined in the controller 87 without the need to modify the existing compositional elements at all, even though a new compositional element is added.

Figure 9:
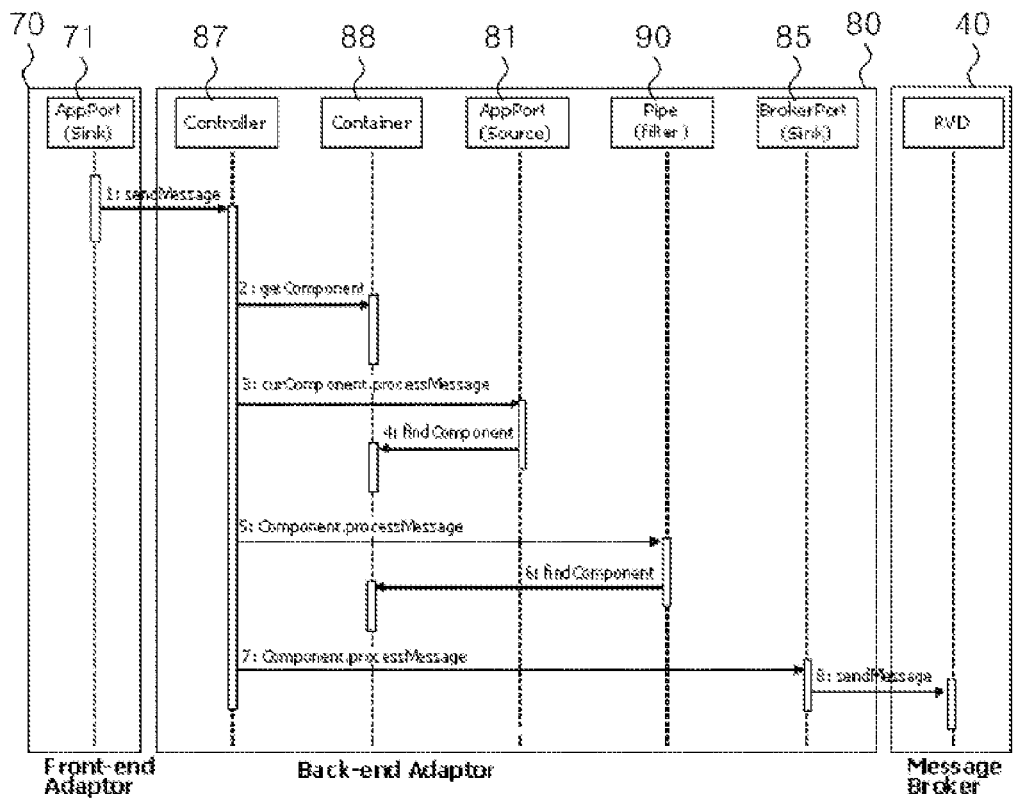
FIG. 9 is a drawing showing the message transmission process of a back-end adaptor shown in FIG. 8.

The process step of sending a message by using the messaging adaptor 30 of this present invention is explained below in combining with the FIG. 9

The message transmitted from a system is delivered through the first application port 72 in the front-end adaptor 70 to the back-end adaptor 80.

As shown in FIG. 7, the compositional elements of the back-end adaptor 80 are controlled by the Spring Framework 88. In case a system is a mobile terminal or home appliance product, the computing ability or the memory space may be greatly reduced in comparison with a general host. In such a case, the front-end adaptor 70 performs the function of just providing a connection between the back-end adaptor 80 and a system, and the Pipes 90 in the back-end adaptor 80 manages the function of producing XML message for supporting the corresponding system. The system delivers the information elements necessary for producing an XML message to the back-end adaptor 80 in the form of a byte stream.

Figure 10:
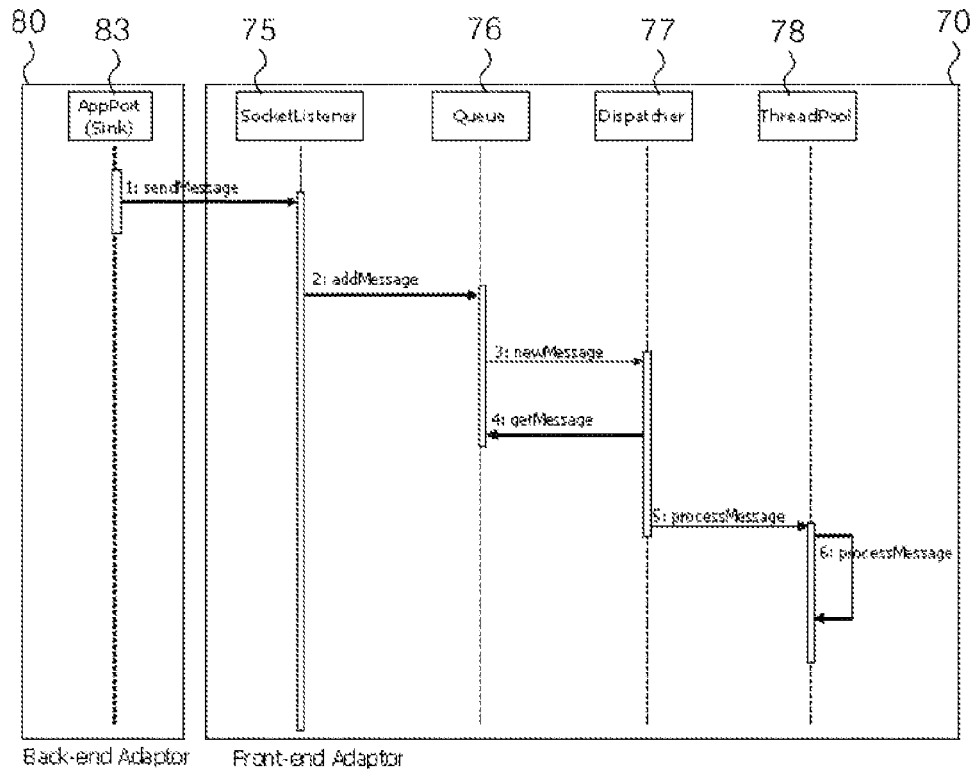
FIG. 10 is a drawing showing the reception message processing of a front-end adaptor shown in FIG. 8.

In the meantime, the receiving process among the processing step of a message of FIG. 10 is illustrated below.

The following functions are performed in the front-end adaptor 70 in delivering to a system with the message received from the message broker 40, as shown in FIG. 7.

First, a message is received through a socket 75 from the back-end adaptor 80.

Second, the message received through the socket 75 from the back-end adaptor 80 is stored in Q 76.

Third, the Q 76 informs a Dispatcher 77 of an event and it stores the message received through the socket 75 from the back-end adaptor 80.

Fourth, the Dispatcher 77 delivers to an idle thread in the Thread Pool 78 that the corresponding message should be processed after bringing out the message from Q 76. Processing a message refers to extracting the important and necessary elements among the information elements within the message. The messaging adaptor extracts the necessary elements according to the things that the system requests by using an API. The extracted results are used in the system.

The procedure described above corresponds to the operation of the system at a general host, but is somewhat different from the above in the case that the system is a mobile terminal or a home appliance product. That is, the function of translating the message consisting of XML is performed in the back-end adaptor 80, and the front-end adaptor 70 manages the function of just providing a connection between the back-end adaptor 80 and a system. Information elements that a system desires are delivered to the system from the back-end adaptor 80 in the form of byte stream.

It is illustrated below for the test result by using two hosts connected to 100 Mbps in order to analyze the performance of the messaging adaptor according to the embodiment of this present invention.

First, the back-end adaptor is set up in one host, the prototypes of two systems including the front-end adaptor are set up in the other host.

One system consecutively transmits 1,000 messages to the other system while differentiating the size of a message. And, it measures the time to receive and process the message in the critical part of the messaging adaptor.

The header and text of a message are in XML format. It includes the time for performing the processing which extracts the field corresponding to the header in the message expressed in XML.

The performance of the host used for the performance analytic test is shown in Table 1 below, and the performance analytic result is shown in Table 2.

TABLE 1

|  | CPU | Memory | Network |
| --- | --- | --- | --- |
| System A | 1 GHz | 512 MB | 100 Mbps |
| System B | 1 GHz | 512 MB | 100 Mbps |

TABLE 2

|  | App Port Source -> App Port Sink(sec) | App Port Source -> Message broker | App Port Source -> App Port Sink(sec) | Total Turnaround Time (sec) | Messages/ sec |
| --- | --- | --- | --- | --- | --- |
| 500 Byte | 1.202 | 0.781 | 1.232 | 3.214 | 293 |
| 1 KB × 1000 times | 1.442 | 0.891 | 1.468 | 3.801 | 263 |
| 2 KB × 1000 times | 2.584 | 1.191 | 2.571 | 6.346 | 157 |

As to the Table 2, the first row is the turnaround time at the active partitions, and the first column is the message size× number of repetition.

As shown in the Table 2, the throughput performance is about 150 through 300 messages per second. That is, it takes about maximum 6 ms from transmitting to receiving one message between two hosts existing on the same network. It may take about 5 ms to process the message for both transmitting and receiving, considering the message delivery time on a network. It means in the ubiquitous environment that it transmits to about 200 systems in a second the data collected from a sensor, or one system receives data in a second from about 200 sensor networks. The research shows that it may sufficiently perform the message transmission burden required in the ubiquitous environment.

In the meantime, the present invention described in the above is not restricted to the above-described embodiment and the attached drawings, but it will be clear to the person having the conventional knowledge in the technical field in which the present invention belongs that various substitutions, deformations and/or changes are available in a range which does not deviate from the technical concept of this invention.

INDUSTRIAL APPLICABILITY

The present invention may be used for the networking field between systems related to the computer network, especially, ubiquitous computing.

The invention claimed is:

1. A system for supporting diversity of a ubiquitous computing environment comprising:
   a message bus including:
      a message broker managing an intermediary role of delivering a message between subsystems; and
      a messaging adaptor managing an interface role between the message broker and each of the subsystems, wherein the messaging adaptor includes:
         a first adaptor including:
            a first application port configured to interface with the subsystems, wherein the first application port is installed in the subsystems,
            a first application source configured to receive a message transfer request from at least one of the subsystems, and
            a first application sink configured to deliver the message received through the message broker to the subsystems, and
         a second adaptor including:
            a second application port configured to interface with the first adaptor and a broker port operating with the message broker,
            pipes positioned between the second application port and the broker port, the pipes configured to produce a message which a subsystem desires among messages delivered from the message broker,
            a queue positioned between the broker port and the pipes, the queue configured to store the message transferred to the messaging adaptor through the message broker, and
            a controller configured to control the second application port, the broker port and the pipes.

2. The system for supporting the diversity of the ubiquitous computing environment of claim 1, wherein a format of the message is XML.

3. The system for supporting the diversity of the ubiquitous computing environment of claim 1, wherein the second application port includes:
   a second application source configured to receive the message transfer request from the first application port, and
   a second application sink configured to deliver a message from the pipes to the first application port.

4. The system for supporting the diversity of the ubiquitous computing environment of claim 3, wherein the broker port includes:
   a sink of the broker port configured to deliver the message from the pipes to the message broker, and
   a source of the broker port configured to deliver the message from the message broker to the pipes.

5. The system for supporting the diversity of the ubiquitous computing environment of claim 4, wherein the message transmitted from the subsystems is delivered to the message broker through the first application sink of the first adaptor, the controller of the second adaptor, the second application source, the pipes and the sink of the message broker.

* * * * *